Patented Sept. 10, 1940

2,214,067

UNITED STATES PATENT OFFICE 2,214,067

PROCESS FOR IMPROVING THE FASTNESS OF DYEINGS

Siegfried Petersen, Cologne-Mulheim, Germany, assignor to General Aniline & Film Corporation, a corporation of Delaware No Drawing. Application July 2, 1938, Serial No. 217,217. In Germany July 3, 1937

6 Claims. (Cl. 8—74)

This invention relates to dyeing with substantive dyestuffs, more especially to improving the fastness to wet treatments of substantive dyeings, and also to products suitable for this purpose.

It has been proposed to improve the fastness of substantive dyeings by aftertreating the dyeings with basic compounds. I have found a new class of compounds which has not been hitherto proposed for this purpose to be especially valuable for improving the fastness to wet treatments of substantive dyeings. These products can be easily manufactured from cheap starting material and in many cases, as regards their effect on the fastness of the dyeings, they are superior to the products which have been previously proposed in this connection. My new process of improving the fastness to wet treatment of substantive dyeings comprises treating the dyeings with an aqueous solution of a condensation product of a basic organic nitrogen compound containing at least one hydrogen atom directly connected with a nitrogen atom, an aliphatic aldehyde and a salt of a nitrogen compound selected from the group consisting of amine salts and ammonium salts. These products may be further reacted with alkylating agents, alkylene oxides etc.

The number of products which can be used as starting material for the manufacture of my agents for improving the fastness of dyeings is very large. As compounds containing a basic nitrogen atom having attached to it at least one reactive hydrogen atom I may mention, for instance, low molecular aliphatic amines, higher aliphatic amines like dodecylamine or the amines from palm kernel fatty acid, aliphatic polyamines or other aliphatic amino compounds like dicyandiamide, biguanide, the mixture of biurate, guanyl urea, guanidine and cyanuric acid which is obtained by heating urea for some time to 160° C., aromatic and heterocyclic amino compounds like aniline, 4.4'diaminodiphenyl urea, quinaldine and the like. Products from dicyandiamide have proved to be especially valuable for the purpose of my invention.

As aliphatic aldehydes to be used as starting material I may mention, for instance, formaldehyde, substances yielding formaldehyde, acetaldehyde, crotonaldehyde etc. In order to obtain water-soluble condensation products it is preferable to employ a considerable excess of the aldehyde.

As the salt component of my products I may use, besides the inorganic ammonium salts, for instance, organic ammonium salts, salts of low molecular aliphatic amines like ethylamine, methylamine, diethylamine, butylamine etc. as well as salts of high molecular aliphatic amines, polyamines, aromatic or heterocyclic amino compounds like, for instance, aniline, toluidine, benzidine, tolidine, dihydrothiotoluidine, benzidine sulfone, aminocarbazol or the like. It may be mentioned that, instead of a mixture of an aldehyde with a salt of an amino compound, such compounds may be used as starting material which in aqueous solution in the presence of acids react like mixtures of such aldehydes and salts like, for instance, hexamethylenetetramine.

The products to be used for the purpose of my invention can be obtained directly in aqueous solution by heating the components in the presence of water. From their solution the products can be isolated in some cases in the form of gelatinous or resinous masses. The products are capable of precipitating acid dyestuffs from their aqueous solutions.

Substantive dyeings of insufficient fastness to wet treatments are treated with aqueous solutions of the said products in the cold or at elevated temperature. The solution may be rendered slightly acid or alkaline and may contain further assisting agents, if desired. There may be used directly the reaction mixtures obtained as above described containing about 1 to 5% (calculated on the weight of the fiber) of my condensation products.

My invention is further illustrated by the following examples without being limited thereto, the parts being by weight.

Example 1

A 6% dyeing on cotton of Direct Deep Black EW extra (Schultz Dyestuff Tables 1931, No. 671) is treated for half an hour at room temperature with an aqueous solution of a condensation product of aniline, formaldehyde and ammonium chloride. The condensation product is prepared by gradually adding to 15 parts of an aqueous solution of formaldehyde (40%) 5 parts ammonium chloride and 5 parts aniline while stirring and heating the mixture for several hours. After rinsing and drying, the dyeing is much improved with regard to its fastness to water.

If instead of the above condensation product, a condensation product of dicyandiamide, formaldehyde and ammonium chloride is used, also the fastness to washing of the dyeing is considerably improved. A solution of the said condensation product is prepared by heating for several hours 30 parts dicyandiamide with 40 parts aqueous formaldehyde (40%), 60 parts water and 30 parts ammonium chloride.

Example 2

A cotton fabric is dyed as usual with 2% Benzo Purpurin (Schultz Dyestuff Tables 1931, No. 448), rinsed and then treated with an aqueous solution of a condensation product obtained by heating 8-amino 2-methylquinoline with ammonium chloride and an excess formaldehyde in the presence of water. The fastness to water of the dyeing is much improved.

Example 3

A 2% dyeing of Benzo Light Red 8 BL (Schultz Dyestuff Tables, 1931, No. 566) is treated with an aqueous solution of a condensation product obtained by refluxing 10 parts dodecylamine, 20 parts of aqueous formaldehyde (40%) and 10 parts ammonium chloride for 20 hours. The fastness to water of the dyeing is considerably improved hereby. Instead of dodecylamine, other amines like stearylamine, polyethylenepolyamines or dimethylaniline may be used with similar results. When treating dyed fabrics with the stearylamine product, the handle of the fabrics is also improved.

Example 4

A substantive dyeing, for instance, of Benzo Fast Scarlet 4 BS (Schultz Dyestuff Tables, 1931, No. 306) is treated with an aqueous solution of a condensation product of dicyandiamide, triethylenetetraminehydrochloride and an excess formaldehyde for about half an hour. The treatment may be carried out in the cold, and the aqueous solution of the condensation product may be rendered slightly acid or alkaline.

The condensation product is obtained by dissolving 15 parts triethylenetetramine in water, neutralizing with hydrochloric acid and refluxing with 30 parts dicyandiamide and 60 parts aqueous formaldehyde (35%) for several hours.

The triethylenetetraminehydrochloride may be replaced by the hydrochlorides of diethylenetriamine or of higher molecular polyethylenepolyamines. Also such products improve the fastness to wet treatments of substantive dyeings like, for instance, of Benzo Light Red 8 BL (Schultz, Dyestuff Tables 1931, No. 566).

Example 5

A 6% dyeing of Direct Deep Black EW extra on cotton is aftertreated with an aqueous solution of a condensation product of 2-aminopyridine, the hydrochlorides of high molecular polyethylenepolyamines and formaldehyde for half an hour at room temperature. The fastness to water of the dyeing is improved.

The condensation product is obtained by refluxing 20 parts of 2-aminopyridine with 15 parts polyethylenepolyamines which have been neutralized with hydrochloric acid, and 60 parts aqueous formaldehyde (35%) for several hours.

Example 6

20 parts polyethylenepolyamines to which an excess hydrochloric acid has been added are heated with 20 parts 4.4'-diaminodiphenyl urea and 60 parts aqueous formaldehyde (35%). When the reaction is complete, the mixture is filtrated and the filtrate used for aftertreating dyeings of Benzo Fast Scarlet 4 BS or of Direct Deep Black EW extra which are improved thereby as regards their fastness to water.

Example 7

53 parts aqueous formaldehyde (35%) are added to a hot solution of 30 parts benzidinehydrochloride and 30 parts dicyandiamide in 100 parts water. After boiling for several hours a gelatinous mass is obtained which on standing separates a light resin which can be worked up under alcohol into a powder which is soluble in hot water.

A similar product is obtained by condensing dicyandiamide with aniline hydrochloride and formaldehyde; instead of aniline hydrochloride, 4-toluidine hydrochloride may be used.

Also heterocyclic compounds like the hydrochlorides of dehydrothiotoluidine or 2-aminocarbazol can be condensed with dicyandiamide and formaldehyde to form products which are soluble in weakly acidulated water.

All these products are capble of considerably improving the fastness to wet treatments of substantive dyeings, for instance, of Direct Deep Black EW extra, Benzo Fast Scarlet 4 BS, Benzo Light Red 8 BL and the like. The amount of the condensation product to be used for the aftertreatment of the said dyeings may be, for instance, 2 to 3%, calculated on the treated material.

Example 8

By treating the 6% dyeing of Direct Deep Black EW extra on cotton with an aqueous solution of a condensation product of dicyandiamide, acetaldehyde and the hydrochlorides of high molecular polyethylenepolyamines, the fastness to water and to a certain extent also the fastness to washing of the dyeing is improved.

The condensation product is obtained by dissolving 15 parts polyethylenepolyamine in water, neutralizing with hydrochloric acid, adding 30 parts dicyandiamide and thereupon slowly adding at elevated temperature 30 parts acetaldehyde. After refluxing the mixture for some time, the excess aldehyde is removed by passing air through the mixture. The resulting brown viscous solution may be used as such for the aftertreatment.

Example 9

On treating a dyeing of Benzo Fast Scarlet 4 BS with a weakly acid aqueous solution of a condensation product of dicyandiamide (30 parts) benzidinesulfonehydrochloride (from 30 parts benzidinesulfone) and aqueous 35% formaldehyde (60 parts), the fastness to water, washing and perspiration of the dyeing is considerably improved.

Example 10

The fastness to water of dyeings with Direct Deep Black EW extra is improved by an aftertreatment with a water-soluble condensation product which is obtained in the following manner: Urea is heated in the oil bath to 160° C. for 20 hours. 30 parts of the resulting mixture are refluxed for several hours in aqueous solution with 15 parts high molecular polyethylenepolyamine which has been neutralized with hydrochloric acid and 60 parts aqueous formaldehyde (35%). The resulting solution may be used as such for the aftertreatment of the dyeing.

Example 11

A dyeing on cotton of Direct Deep Black EW extra is rinsed and then treated with an aqueous solution containing per liter 10 ccms. of a condensation product of dicyandiamide, acetaldehyde and ammonium chloride for half an hour at room temperature, rinsed and dried. The fastness to water of the dyeing is much improved.

The said condensation product can be obtained, for instance, by adding gradually 30 parts acetaldehyde to a solution of 30 parts dicyandiamide and 30 parts ammonium chloride in 70 parts water at 50° C. The mixture is thereupon slowly heated to higher temperatures and refluxed for several hours. The resulting solution can be diluted with water. The excess acetaldehyde may be removed by passing air through the mixture.

*Example 12*

Cotton dyed with 2% Benzo Purpurin is treated at room temperature with an aqueous solution of a condensation product of dicyandiamide, ammonium chloride and crotonaldehyde. The fastness to water of the dyeing is improved. When treating a Direct Deep Black dyeing in the same manner, also the fastness to washing is improved.

The condensation product may be prepared in the following manner: 50 parts crotonaldehyde are gradually added to a boiling solution of 30 parts dicyandiamide and 30 parts ammoniumchloride in 150 parts water. After refluxing for 12 hours the crotonaldehyde odor has disappeared and the resulting opalescent syrup can be diluted with water.

*Example 13*

A 2% dyeing of Benzo Fast Scarlet 4BS on cotton is aftertreated for half an hour at room temperature with an aqueous solution containing per liter 15 ccms. of a condensation product of dicyandiamide, hexamethylenetetramine and hydrochloric acid, rinsed and dried. The fastness to water and to washing of the dyeing is improved; the shade of the dyeing remains practically unchanged.

The condensation product can be prepared by heating 200 parts dicyandiamide and 400 parts hexamethylenetetramine in 650 parts water to boiling, adding 400 parts hydrochloric acid (sp. gr. 1.10) in the course of 2 hours and refluxing the mixture for 2 more hours. From the resulting clear stable solution of neutral to weakly alkaline reaction, the condensation product may be precipitated by adding a strong alkali.

On using formic acid instead of hydrochloric acid, a similar product is obtained which improves the fastness to wet treatments of substantive dyeings like, for instance, of Diamine Green B (Schultz Dyestuff Tables, 1931, No. 668).

*Example 14*

Cotton dyed with 6% Direct Deep Black EW extra is aftertreated with an aqueous solution of the condensation product from biguanide sulfate, hexamethylenetetramine and hydrochloric acid, rinsed and dried. The fastness to wet treatments of the dyeing is improved. By aftertreating with the said product, also the fastness to water of a Benzo Purpurin dyeing can be improved.

The condensation product of this example is obtainable, for instance, by heating 15 parts biguanide sulfate and 30 parts hexamethylenetetramine in 100 parts water to boiling, gradually adding in the course of 1½ hours 35 parts hydrochloric acid (sp. gr. 1.10) and heating until the condensation is complete.

*Example 15*

The fastness to wet treatments of a 6% dyeing of Direct Deep Black EW extra is improved by aftertreating the dyeing with 3% (calculated on the weight of the material) of a condensation product of aniline, hexamethylenetetramine and formic acid.

The condensation product can be obtained by heating 80 parts hexamethylenetetramine dissolved in 150 parts water with 30 parts formic acid to boiling. 30 parts aniline are gradually added and the mixture is heated for several hours. After cooling the resulting yellow resin is isolated and heated together with hydrochloric acid. The resin dissolves and on cooling separates in the form of a jelly-like mass which solidifies under organic solvents. The mass, which can be pulverized, is soluble in hot water.

*Example 16*

The fastness to wet treatments of a dyeing of Direct Deep Black EW extra is improved by aftertreatment for half an hour at room temperature with an aqueous solution of the condensation product of dicyandiamide, ammoniumthiocyanate and formaldehyde. 1 to 2% of the product are sufficient.

The condensation product can be prepared by dissolving 30 parts dicyandiamide and 30 parts ammoniumthiocyanate in 40 parts water, adding 60 parts aqueous formaldehyde (30%) and boiling for 20 minutes. On cooling a yellowish resin separates which can be worked up into a powder under alcohol.

I claim:

1. A process for improving the fastness to wet treatments of substantive dyeings which comprises treating the dyeings with an aqueous solution of a finished condensation product of a basic organic nitrogen compound containing at least one hydrogen atom directly connected with a nitrogen atom, an aliphatic aldehyde and a salt of a nitrogen compound selected from the group consisting of amine salts and ammonium salts.

2. A process for improving the fastness to wet treatments of substantive dyeings which comprises treating the dyeings with an aqueous solution of a finished condensation product of an aliphatic amino compound, an aliphatic aldehyde and a salt of a nitrogen compound selected from the group consisting of amine salts and ammonium salts.

3. A process for improving the fastness to wet treatments of substantive dyeings which comprises treating the dyeings with an aqueous solution of a finished condensation product of dicyandiamide, an aliphatic aldehyde and a salt of a nitrogen compound selected from the group consisting of amine salts and ammonium salts.

4. A process for improving the fastness to wet treatments of substantive dyeings which comprises treating the dyeings with an aqueous solution of a finished condensation product of dicyandiamide, formaldehyde and an inorganic ammonium salt.

5. A process for improving the fastness to wet treatments of substantive dyeings which comprises treating the dyeings with an aqueous solution of a finished condensation product of dicyandiamide, formaldehyde and benzidine hydrochloride.

6. A process for improving the fastness to wet treatments of substantive dyeings which comprises treating the dyeings with an aqueous solution of a finished condensation product of dicyandiamide, formaldehyde and the hydrochlorides of polyethylenepolyamines.

SIEGFRIED PETERSEN.